Sept. 10, 1968  P. P. NOZNICK ET AL  3,400,722
FOAMED WHIPPED SMOKE FILTER
Filed Sept. 8, 1965
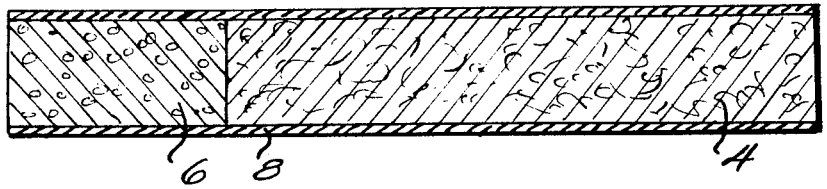
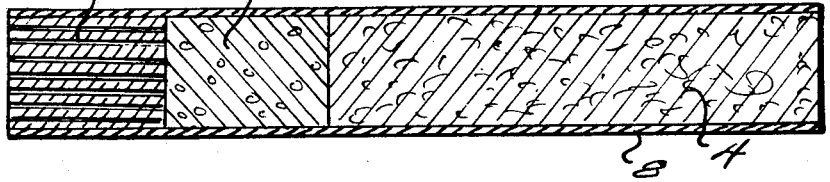
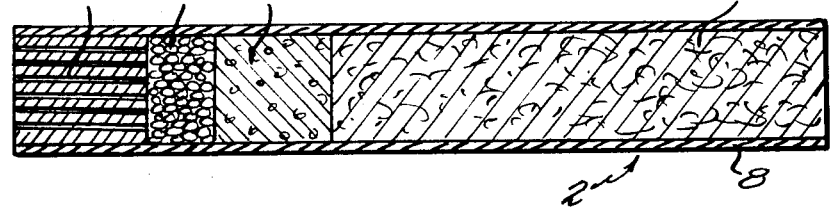
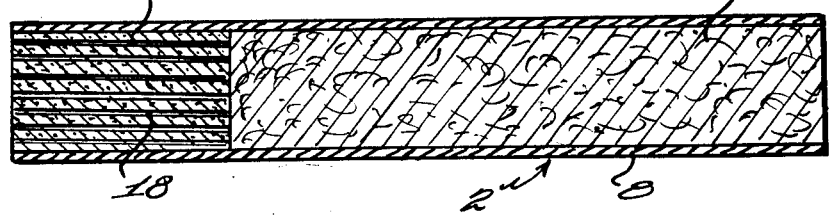
INVENTORS
PETER P. NOZNICK
ROBERT H. BUNDUS
BY Cushman, Darby & Cushman
ATTORNEYS

3,400,722
FOAMED WHIPPED SMOKE FILTER
Peter P. Noznick, Chicago, and Robert H. Bundus, Riverside, Ill., assignors to Beatrice Foods Co., Chicago, Ill., a corporation of Delaware
Filed Sept. 8, 1965, Ser. No. 485,779
6 Claims. (Cl. 131—10.7)

ABSTRACT OF THE DISCLOSURE

A smoker's article with a filter of increased porosity and surface area. The filter material itself is a foamed whipped, dried, finely divided, porous emulsified fat.

---

This invention relates to a novel smoker's article filter.

It is an object of the present invention to develop a novel tobacco filter.

Another object is to develop a tobacco filter which has a high efficiency for removing tars and nicotine.

An additional object is to develop a more porous fat-containing filter.

It has now been found that these objects can be attained by the use of certain novel filters as hereinafter set forth.

While the following disclosure is primarily directed to the use of the novel filters in cigarettes, it is to be understood that the filters can also be employed as filters for other smokers' articles such as cigars and pipes.

As the novel filter of the present invention there is employed a foamed, porous fat-containing composition. This can be used as the sole filter or there can also be employed conventional filters, e.g., fibrous filters such as alpha cellulose fibers, cotton fibers, viscose rayon, cellulose ester fibers, e.g., cellulose acetate and cellulose acetate-butyrate, asbestos fibers, polypyrrolidone fibers, etc.

These can also be added conventional granular or pulverulent filtering agents such as activated carbon used as filters, for example in Lark and Tareyton brands of cigarettes. A granular activated carbon filter of the type employed in Lark cigarettes is disclosed in Portugese Patent 40,999. There can also be used granular adsorbents such as activated alumina, silica gel and ion exchange resins, e.g., cation exchange resins such as sulfonated styrene-divinyl benzene copolymer (available commercially as Dowex 50), sulfonated phenol-formaldehyde and ethylene glycol dimethacrylate-methacrylic acid copolymer and anion exchange resins such as phenoltetraethylene pentamine-formaldehyde resin and quaternary ammonium results prepared by reacting a tertiary amine with a haloalkylated cross-linked copolymer of a monovinyl hydrocarbon and polyvinyl hydrocarbon, e.g., the reaction product of trimethyl amine with a chlormethylated cross-linked copolymer of 92% styrene and 8% divinyl benzene by weight (Amberlite IRA-400).

As the fat there can be employed any solid fat or oil. As used in the claims, the term fat is designed to cover both liquid and solid fats unless otherwise indicated. Among suitable fats which can be used are cottonseed oil, safflower oil, corn oil, soybean oil, butterfat, coconut oil, penaut oil, lard, hydrogenated cottonseed oil, hydrogenated corn oil, hydrogenated soybean oil, hydrogenated peanut oil, olive oil, hydrogenated olive oil, hydrogenated coconut oil, e.g., hydrogenated to a melting point of 92° F. In some instances paraffin or wax can be used to replace the fat.

The fat is emulsified and foamed by whipping with a finite amount of gas and then dried. For example, the foam can be freeze dried and then pulverized and classified to different sizes, all of a porous nature. The porous nature of the filter particles has the twofold advantage of greater ease in permitting the smoke to pass through and a much larger surface area for removal of the tars and nicotine.

Any non-toxic gas can be employed as the whipping agent, e.g., air, nitrogen, oxygen, nitrous oxide, carbon dioxide, dichlorodifluoromethane, dichlorotetrafluoroethane, chlorotrifluoromethane and the other volatile fluorine containing gases available as Freons.

Of course, there are preferably added whipping and/or emulsifying agents or gums such as gelatin, guar gum or carboxymethyl cellulose.

There can be used whipped cream substitutes such as Whip-Treme, Dreamwhip or Lucky Whip or there can even be used whipped cream itself. The whipped cream substitutes as is known in the art are powders and water is added thereto and the mixture is then whipped.

In addition to freeze drying there can be used other conventional drying procedures, e.g., foam mat drying. In this latter procedure a stable foam is made with pressurized gas and is spread on a porous bed and dried by blowing air up through the bed and the mat which results from the drying. The porous bed can be foamed of perforated platens or trays with perforated bottoms. When the product is dry it can be removed as a chunk and broken down to desired particle size, e.g., minus 40 (Tyler sieve series).

As previously indicated there can be employed gums and the like as emulsifying agents. These gums can be employed to encase the fat. Thus there can be used carbohydrate gums such as gum arabic, gum tragacanth, gum karaya, and locust bean gum, pectin, methyl cellulose, hydroxymethyl cellulose, carboxymethyl cellulose and proteinaceous materials such as sodium caseinate and gelatin. The gum or the like, when employed, is frequently in an amount of 25–95% preferably 40–70% of the total of the weight of the fat and gum although they can be used in an amount as little as 1–15% of the mix (dry weight).

As whipping agents there are preferably employed polyglycerol partial esters of fatty acids, e.g., diglycerol to triconto (30 glycerol units) glycerol esters of higher fatty acids. Of the polyglycerol esters the preferred are triglycerol to decaglycerol partial esters of high fatty acids, e.g., containing 12 to 22 carbon atoms in the fatty acid.

Examples of suitable polyglycerol esters are triglycerol monostearate, triglycerol mono shortening (triglycerol mono ester of the acids of cottonseed oil), triglycerol monooleate, hexaglycerol monostearate, hexaglycerol mono shortening, hexaglycerol monooleate, hexaglycerol dioleate, hexaglycerol di shortening, hexaglycerol hexaoleate, decaglycerol monostearate, decaglycerol mono shortening, decaglycerol monooleate, decaglycerol mono laurate, decaglycerol tristearate, decaglycerol tri shortening, decaglycerol trioleate, decaglycerol tri linoleate, decaglycerol decastearate, decaglycerol decaoleate, decaglycerol deca linoleate, decaglycerol tetraoleate, diglycerol monostearate, dodecaglycerol hexapalmitate, decaglycerol tripalmitate, decaglycerol diarachinate, triglycerol mono behenate, dodecaglycerol trilignocerate, decaglycerol mono linoleate, hexaglycerol diricinoleate, decaglycerol deca myristate, decaglycerol triester of soybean oil acids, decaglycerol tetra ester of cottonseed oil acids, hexaglycerol mono ester of coconut oil acids, triglycerol mono ester of peanut oil acids, decaglycerol deca ester of corn oil acids, decaglycerol ester deca ester of hydrogenated cottonseed oil acids.

Another preferred class of whipping agents includes propylene glycol monostearate, butylene glycol monostearate, propylene glycol mono palmitate, butylene glycol mono palmitate, propylene glycol monooleate, butylene glycol monooleate, glycerol lacto monooleate, glycerol lacto monopalmitate, glycerol lacto monostearate, dipropylene glycol monostearate.

The whipping agent is used in an amount of 0.1 to 30%, preferably 2 to 3% of the weight of the fat. Frequently the whipping agent is used in an amount of 0.5 to 10% of the weight of the fat.

Unless otherwise indicated all parts and percentages in the present specification and claims are by weight.

There can also be added mono and diglycerides, e.g., a mixture of 40 to 47% monoglycerides, 43 to 45% diglycerides and the balance triglycerides. These glycerides are primarily glycerol stearates although some palmitate is normally also present. The mono and diglycerides are used in an amount of 1 to 10% of the mix (dry weight). The mono- and diglycerides are well known emulsifiers.

There can also be added sugars such as cane sugar, beet sugar, lactose, d-glucose, e.g., corn sugar or corn syrup, and dextrin as fillers and flavor imparting agents. The sugar, when employed, is used in an amount of 15 to 50% of the total mix (dry weight).

In preparing the whip there is usually added sufficient water to give 30 to 60%, preferably 35 to 40% of solids. The aqueous mixture is pasteurized in conventional fashion, e.g., at 140–165° F. for 40–20 minutes, usually 155–160° F. for 30 minutes and is then homogenized at about pasteurization temperature at a pressure of 100 to 2500° p.s.i., preferably 1500 p.s.i.

The emulsified, homogenized product is then ready to be whipped by any conventional procedure, e.g., with an electric mixer which beats in the foaming gas and is then dried in conventional fashion, e.g., by freeze drying or foam mat drying.

Examples of suitable whips are given in the following examples.

EXAMPLE 1

| | Parts |
|---|---|
| Hydrogenated cottonseed oil | 59.0 |
| Decaglycerol tetroaleate | 1.0 |
| Mono- and diglycerides | 4.8 |
| Glycerol lacto monopalmitate | 3.1 |
| Glycerol monooleate | 0.6 |
| Sodium caseinate | 0.05 |
| Cane sugar | 12.5 |
| Corn syrups (15 D.E.) | 12.5 |
| Salt | 0.225 |

This mixture was pasteurized, emulsified and homogenized at 500 p.s.i. in water at 155–160° F. at 40% total solids and air whipped with an electric beater to give a foam which was then freeze dried into porous balls which are in turn pulverized or fractured to particles of less than 100 mesh.

EXAMPLE 2

The process of Example 1 was repeated using the following mix:

| | Parts |
|---|---|
| Hydrogenated cottonseed oil | 47 |
| Mono- and diglycerides | 3.8 |
| Decaglycerol tristearate | 3.0 |
| Sodium caseinate | 5.8 |
| Corn sugar | 11.05 |
| Cane sugar | 9.85 |
| Sodium alginate | 0.04 |
| Salt | 0.18 |

EXAMPLE 3

The process of Example 1 was repeated with the following formula:

| | Parts |
|---|---|
| Hydrogenated cottonseed oil | 49 |
| Lecithin | 1 |
| Sodium caseinate | 10 |
| Cane sugar | 15 |
| Propylene glycol monostearate | 10 |

The process of Example 1 was repeated with the following formula:

EXAMPLE 4

| | Parts |
|---|---|
| Hydrogenated cottonseed oil | 47.5 |
| Mono an diglycerides | 2.5 |
| Glycerol lacto monopalmitate | 10.0 |
| Sugar | 10.0 |
| Sodium caseinate | 10.0 |

Any of the dried foams of Examples 1–4 were suitable as cigarette filters. Freeze dried or foam mat dried whipped cream was similarly useful.

The invention will be understood best in connection with the drawings wherein:

FIGURE 1 is a sectional view of a cigarette having a filter according to the invention;

FIGURE 2 is a sectional view of another cigarette having a modified filter according to the invention;

FIGURE 3 is a sectional view of a cigarette illustrating another embodiment of the invention; and FIGURE 4 is a sectional view of a cigarette illustrating an alternative embodiment of the invention.

Referring more specifically to FIGURE 1, there is provided a cigarette indicated generically at 2 comprising tobacco 4 and a filter 6 encased in an overall outer paper wrapper 8. The filter 6 is made of the freeze dried particles produced by the fracturing of the freeze dried, foamed whipped porous balls of Example 1.

In FIGURE 2 the cigarette 2 comprises a rod of tobacco 4 and a filter 6 made of the same spray dried powder as that shown in FIGURE 1. There is also an after filter 10 made of cellulose acetate fibers. The cigarette is encased in an overall outer paper wrapper 8.

In FIGURE 1 the cigarette 2 comprises tobacco 4 and filter 6 made of the same spray dried powder as that shown in FIGURE 1. There was also provided a granular activated carbon filter 12 and a final filter 14 of alpha cellulose fibers. The alpha cellulose fibers were impregnated with an equeous extract of tobacco and dried prior to use in the cigarette. Tobacco 4 and filters 6, 12, and 14 were encased in overall outer paper wrapper 8.

In FIGURE 4 the cigarette 2 comprises tobacco 4 and filter 16. Filter 16 was prepared by incorporating particles of as pray dried mixture of 50% gum acacia and 50% concentrated aqueous tobacco extract on filter paper fibers in the presence of moisture to incorporate the power as particles 18 on the surface of the filter paper fibers and then drying the filter. An overall paper wrapper 8 then was employed to encase the tobacco 4 and filter 16.

What is claimed is:

1. The combination with a smoker's article having therein a smoke passage of substantial cross-section of a filter comprising a foamed whipped, dried, finely divided, porous emulsified fat.

2. A smoker's article according to claim 1 wherein the emulsifier is selected from the group consisting of alkylene glycol mono esters of higher fatty acids, polyglycerol partial esters of higher fatty acids, and glycerol esters of lacto higher fatty acids.

3. A smoker's article according to claim 1 which is a cigarette.

4. The method of purifying tobacco smoke comprising passing it through the smoker's article of claim 1.

5. An article according to claim 1 wherein the fat is a vegetable fat.

6. An article according to claim 1 wherein the fat is an animal fat.

References Cited

UNITED STATES PATENTS 3,006,347 10/1961 Keaton _____ 131—15
3,279,476 10/1966 Noznick et al. _____ 131—10.7

FOREIGN PATENTS 173,262 12/1952 Austria.
945,142 12/1963 Great Britain.

SAMUEL KOREN, *Primary Examiner*

D. J. DONOHUE, *Assistant Examiner*